US012639549B2

(12) United States Patent
Barkan et al.

(10) Patent No.: US 12,639,549 B2
(45) Date of Patent: May 26, 2026

(54) DEEP SELF-ATTENTION MATRIX MODEL REFINEMENT

(71) Applicant: Microsoft Technology Licensing, LLC, Redmond, WA (US)

(72) Inventors: Oren Barkan, Rishon Lezion (IL); Edan Hauon, Tel-Aviv (IL); Ori Katz, Tel-Aviv (IL); Avi Caciularu, Tel-Aviv (IL); Itzik Malkiel, Givaatayim (IL); Omri Armstrong, Raanana (IL); Amir Hertz, Tel Aviv (IL); Noam Koenigstein, Tel-Aviv (IL); Nir Nice, Salit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1225 days.

(21) Appl. No.: 17/452,952

(22) Filed: Oct. 29, 2021

(65) Prior Publication Data

US 2023/0137692 A1 May 4, 2023

(51) Int. Cl.
*G06N 3/04* (2023.01)
*G06N 3/063* (2023.01)

(52) U.S. Cl.
CPC .............. *G06N 3/04* (2013.01); *G06N 3/063* (2013.01)

(58) Field of Classification Search
CPC ......... G06N 3/0475; G06N 3/04; G06N 3/063
See application file for complete search history.

(56) References Cited

FOREIGN PATENT DOCUMENTS

WO WO-2020097461 A1 * 5/2020

OTHER PUBLICATIONS

Yaru et al., Self-Attention Attribution: Interpreting Information Interactions Inside Transformer, Feb. 25, 2021, AAAI Conference on Artificial Intelligence, v2, pp. 2-5 (Year: 2021).*
Lee, Kuang-Huei, "Stacked Cross Attention for Image-Text Matching", ECCV 2018 conference (obtained from <<https://openaccess.thecvf.com/content_ECCV_2018/papers/Kuang-Huei_Lee_Stacked_Cross_Attention_ECCV_2018_paper.pdf>> on Dec. 11, 2025) (Year: 2018).*
Hao, et al., "Self-Attention Attribution: Interpreting Information Interactions Inside Transformer", In Repository of arXiv:2004.11207v2, Feb. 25, 2021, 9 Pages.

(Continued)

*Primary Examiner* — Michael J Huntley
(74) *Attorney, Agent, or Firm* — Holzer Patel Drennan

(57) ABSTRACT

A computing system scores importance of a number of tokens in an input token sequence to one or more prediction scores computed by a neural network model on the input token sequence. The neural network model includes multiple encoding layers. Self-attention matrices of the neural network model are received into an importance evaluator. The self-attention matrices are generated by the neural network model while computing the one or more prediction scores based on the input token sequence. Each self-attention matrix corresponds to one of the multiple encoding layers. The importance evaluator generates an importance score for one or more of the tokens in the input token sequence. Each importance score is based on a summation as a function of the self-attention matrices, the summation being computed across the tokens in the input token sequence, across the self-attention matrices, and across the multiple encoding layers in the neural network model.

24 Claims, 5 Drawing Sheets

(56) References Cited

OTHER PUBLICATIONS

"International Search Report and Written Opinion Issued in PCT Application No. PCT/US22/045829", Mailed Date: Feb. 3, 2023, 13 Pages.

Skrlj, et al., "Feature Importance Estimation with Self-Attention Networks", In Repository of arXiv:2002.04464v1, Feb. 11, 2020, 8 Pages.

Abnar, et al., "Quantifying Attention Flow in Transformers", In Proceedings of the 58th Annual Meeting of the Association for Computational Linguistics, Jul. 5, 2020, pp. 4190-4197.

Adebayo, et al., "Sanity Checks for Saliency Maps", In Proceedings of 32nd Conference on Neural Information Processing Systems, Dec. 3, 2018, pp. 1-11.

Barkan, et al., "Bayesian Hierarchical Words Representation Learning", In Proceedings of the 58th Annual Meeting of the Association for Computational Linguistics, Jul. 5, 2020, pp. 3871-3877.

Barkan, Oren, "Bayesian Neural Word Embedding", In Proceedings of the Thirty-First AAAI Conference on Artificial Intelligence, Feb. 4, 2017, pp. 3135-3143.

Barkan, et al., "GAM: Explainable Visual Similarity and Classification via Gradient Activation Maps", In Repository of arXiv:2109. 00951v1, Sep. 2, 2021, 13 Pages.

Barkan, et al., "Scalable Attentive Sentence-Pair Modeling via Distilled Sentence Embedding", In Proceedings of the Thirty-Fourth AAAI Conference on Artificial Intelligence, Feb. 7, 2020, pp. 3235-3242.

Barkan, et al., "Within-Between Lexical Relation Classification", In Proceedings of the 2020 Conference on Empirical Methods in Natural Language Processing (EMNLP), Nov. 16, 2020, pp. 3521-3527.

Bastings, et al., "The Elephant in the Interpretability Room: Why use Attention as Explanation when we have Saliency Methods", In Proceedings of the Third BlackboxNLP Workshop on Analyzing and Interpreting Neural Networks for NLP, Nov. 20, 2020, pp. 149-155.

Ben-Baruch, et al., "Asymmetric Loss For Multi-Label Classification", In Repository of arXiv:2009.14119v1, Sep. 29, 2020, 13 Pages.

Chan, et al., "SalKG: Learning From Knowledge Graph Explanations for Commonsense Reasoning", In Repository of arXiv:2104. 08793v2, Jul. 12, 2021, 6 Pages.

Chattopadhay, et al., "Grad-CAM++: Generalized Gradient-Based Visual Explanations for Deep Convolutional Networks", In Proceedings of the IEEE Winter Conference on Applications of Computer Vision, Mar. 12, 2018, pp. 839-847.

Chen, et al., "Adapting Grad-CAM for Embedding Networks", In Proceedings of IEEE Winter Conference on Applications of Computer Vision, Mar. 1, 2020, pp. 2794-2803.

Chrysostomou, et al., "Variable Instance-Level Explainability for Text Classification", In Repository of arXiv:2104.08219v1, Apr. 16, 2021, 16 Pages.

Clark, et al., "What does BERT look at? An Analysis of BERT's Attention", In Proceedings of the Second BlackboxNLP Workshop on Analyzing and Interpreting Neural Networks for NLP, Aug. 1, 2019, pp. 276-286.

Dai, et al., "Semi-Supervised Sequence Learning", In Proceedings of Advances in Neural Information Processing System, Dec. 7, 2015, 9 Pages.

Del Corso, et al., "Ranking a Stream of News", In Proceedings of the 14th International Conference on World Wide Web, May 10, 2005, pp. 97-106.

Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.

Devlin, et al., "Bert: Pre-training of deep bidirectional transformers for language understanding", In Repository of arXiv:1810.04805v2, May 24, 2019, 16 Pages.

Doshi-Velez, et al., "Accountability of AI Under the Law: The Role of Explanation", In Repository of arXiv:1711.01134v1, Nov. 3, 2017, 14 Pages.

Ebrahimi, et al., "HotFlip: White-Box Adversarial Examples for Text Classification", In Proceedings of the 56th Annual Meeting of the Association for Computational Linguistics, Jul. 15, 2018, pp. 31-36.

Everingham, et al., "The PASCAL Visual Object Classes (VOC) Challenge", In International Journal of Computer Vision, vol. 88, Issue 2, Jun. 2010, pp. 303-338.

He, et al., "Deep Residual Learning for Image Recognition", In Proceedings of the IEEE Conference on Computer Vision and Pattern Recognition, Jun. 27, 2016, pp. 770-778.

Hoffer, et al., "Deep Metric Learning Using Triplet Network", In Proceedings of International Workshop on Similarity-Based Pattern Recognition, Oct. 12, 2015, 8 Pages.

Hitut, et al., "Do Attention Heads in BERT Track Syntactic Dependencies?", In Repository of arXiv:1911.12246v1, Nov. 27, 2019, 7 Pages.

Juang, et al., "Densely connected convolutional networks", In Proceedings of the IEEE conference on computer vision and pattern recognition, Jul. 21, 2017, pp. 4700-4708.

Jain, et al., "Attention is not Explanation", In Repository of arXiv:1902. 10186v3, May 8, 2019, 16 Pages.

Jain, et al., "Learning to Faithfully Rationalize by Construction", In Proceedings of the 58th Annual Meeting of the Association for Computational Linguistics, Jul. 5, 2020, pp. 4459-4473.

Joshi, et al., "BERT for Coreference Resolution: Baselines and Analysis", In Proceedings of the 2019 Conference on Empirical Methods in Natural Language Processing and the 9th International Joint Conference on Natural Language Processing, Nov. 3, 2019, pp. 5803-5808.

Khashabi, et al., "Looking Beyond the Surface: A Challenge Set for Reading Comprehension over Multiple Sentences", In Proceedings of the Conference of the North American Chapter of the Association for Computational Linguistics: Human Language Technologies, Jun. 6, 2018, pp. 252-262.

Lecun, et al., "Gradient-based learning applied to document recognition", In Proceedings of the IEEE, vol. 86, Issue: 11, Nov. 1998, pp. 1-46.

Li, et al., "Normal vs. Adversarial: Salience-based Analysis of Adversarial Samples for Relation Extraction", In Repository of arXiv:2104.00312v3, Aug. 22, 2021, 9 Pages.

Lin, et al., "Microsoft Coco: Common Objects in Context", In the Proceedings of 13th European Conference on Computer Vision, Sep. 6, 2014, pp. 740-755.

Maas, et al., "Learning Word Vectors for Sentiment Analysis", In Proceedings of the 49th Annual Meeting of the Association for Computational Linguistics: Human Language Technologies, Jun. 19, 2011, pp. 142-150.

Mahendran, et al., "Visualizing deep convolutional neural networks using natural pre-images", In International Journal of Computer Vision, vol. 120, Issue 6, Dec. 2016, pp. 1-25.

Mikolov, et al., "Distributed Representations of Words and Phrases and their Compositionality", In Proceedings of the 27th Annual Conference on Neural Information Processing Systems, Dec. 5, 2013, 9 pages.

Nguyen, Dong, "Comparing Automatic and Human Evaluation of Local Explanations for Text Classification", In Proceedings of the Conference of the North American Chapter of the Association for Computational Linguistics: Human Language Technologies, vol. 1, Jun. 1, 2018, pp. 1069-1078.

Patro, et al., "Explanation vs attention: A two-player game to obtain attention for VQA", In Proceedings of the Thirty-Fourth AAAI Conference on Artificial Intelligence, Apr. 3, 2020, pp. 11848-11855.

Patro, et al., "U-CAM: Visual Explanation using Uncertainty based Class Activation Maps", In Proceedings of the IEEE/CVF International Conference on Computer Vision, Oct. 27, 2019, pp. 7444-7453.

Pennington, et al., "Glove: Global Vectors for Word Representation", In Proceedings of Conference on Empirical Methods in Natural Language Processing, Oct. 25, 2014, pp. 1532-1543.

(56) References Cited

OTHER PUBLICATIONS

Peters, et al., "Deep Contextualized Word Representations", In Proceedings of the Conference of the North American Chapter of the Association for Computational Linguistics: Human Language Technologies, vol. 1 (Long Papers), Jun. 1, 2018, pp. 2227-2237.

Pruthi, et al., "Learning to Deceive with Attention-Based Explanations", In Repository of arXiv:1909.07913v1, Sep. 17, 2019, 7 Pages.

Radenovic, et al., "CNN Image Retrieval Learns from BoW: Unsupervised Fine-Tuning with Hard Examples", In Proceedings of European Conference on Computer Vision, Oct. 11, 2016, 17 Pages.

Radford, et al., "Improving Language Understanding by Generative Pre-training", Retrieved From: https://www.cs.ubc.ca/~amuham01/LING530/papers/radford2018improving.pdf, Jun. 11, 2018, 12 Pages.

Rajpurkar, et al., "CheXNet: Radiologist-Level Pneumonia Detection on Chest X-Rays with Deep Learning", In Repository of arXiv:1711.05225v3, Dec. 25, 2017, 7 Pages.

Rogers, et al., "A Primer in BERTology: What we know about how BERT works", In Repository of arXiv:2002.12327v1, Feb. 27, 2020, 15 Pages.

Russakovsky, et al., "ImageNet Large Scale Visual Recognition Challenge", In International Journal of Computer Vision, vol. 115, Issue 3, Apr. 11, 2015, pp. 211-252.

Schroff, et al., "FaceNet: A Unified Embedding for Face Recognition and Clustering", In Proceedings of the IEEE Conference on Computer Vision and Pattern Recognition, Jun. 7, 2015, pp. 815-823.

Selvaraju, et al., "Grad-CAM: Visual Explanations From Deep Networks via Gradient-Based Localization", In Proceedings of the IEEE International Conference on Computer Vision, Oct. 22, 2017, pp. 618-626.

Serrano, et al., "Is Attention Interpretable?", In Proceedings of the 57th Annual Meeting of the Association for Computational Linguistics, Jul. 28, 2019, pp. 2931-2951.

Simonyan, et al., "Deep Inside Convolutional Networks: Visualising Image Classification Models and Saliency Maps", In Repository of arXiv:1312.6034v1, Dec. 20, 2013, 8 Pages.

Zeiler, et al., "Visualizing and Understanding Convolutional Networks", In Proceedings of European Conference on Computer Vision, Sep. 6, 2014, pp. 818-833.

Socher, et al., "Recursive Deep Models for Semantic Compositionality Over a Sentiment Treebank", In Proceedings of the Conference on Empirical Methods in Natural Language Processing, Oct. 18, 2013, pp. 1631-1642.

Song, et al., "Deep Metric Learning via Lifted Structured Feature Embedding", In Proceedings of the IEEE Conference on Computer Vision and Pattern Recognition, Jun. 27, 2016, pp. 4004-4012.

Springenberg, et al., "Striving for Simplicity: The All Convolutional Net", In Repository of arXiv:1412.6806v1, Dec. 21, 2014, 12 Pages.

Stylianou, et al., "Visualizing Deep Similarity Networks", In Proceedings of the IEEE Winter Conference on Applications of Computer Vision (WACV), Jan. 7, 2019, pp. 2029-2037.

Sun, Yi, "Deep Learning Face Representation by Joint Identification-Verification", In a Thesis Submitted in Information Engineering to The Chinese University of Hong Kong, Sep. 2015, 24 Pages.

Sundararajan, et al., "Axiomatic Attribution for Deep Networks", In Proceedings of the 34th International Conference on Machine Learning, Aug. 6, 2017, 10 Pages.

Tai, et al., "exBERT: Extending Pre-trained Models with Domain-specific Vocabulary Under Constrained Training Resources", In Proceedings of the Conference on Empirical Methods in Natural Language Processing: Findings, Nov. 16, 2020, pp. 1433-1439.

Tolias, et al., "Particular Object Retrieval with Integral Max-Pooling of CNN Activations", In Repository of arXiv:1511.05879v1, Nov. 18, 2015, 11 Pages.

Vaswani, et al., "Attention Is All You Need", In Proceedings of the 31st Conference on Neural Information Processing Systems, Dec. 4, 2017, 11 Pages.

Vellido, et al., "Making Machine Learning Models Interpretable", In Proceedings of 20th European Symposium on Artificial Neural Networks, Computational Intelligence and Machine Learning, Apr. 25, 2012, pp. 163-172.

Vig, Jesse, "Visualizing Attention in Transformer-Based Language Representation Models", In Repository of arXiv:1904.02679v2, Apr. 11, 2019, 6 Pages.

Wallace, et al., "AllenNLP Interpret: A Framework for Explaining Predictions of NLP Models", In Proceedings of the Conference on Empirical Methods in Natural Language Processing and the 9th International Joint Conference on Natural Language Processing, Nov. 3, 2019, pp. 7-12.

Wang, et al., "ChestX-Ray8: Hospital-Scale Chest X-Ray Database and Benchmarks on Weakly-Supervised Classification and Localization of Common Thorax Diseases", In Proceedings of the IEEE Conference on Computer Vision and Pattern Recognition (CVPR), Jul. 21, 2017, pp. 3462-3471.

Wang, et al., "GLUE: A Multi-Task Benchmark and Analysis Platform for Natural Language Understanding", In Proceedings of the EMNLP Workshop BlackboxNLP: Analyzing and Interpreting Neural Networks for NLP, Nov. 1, 2018, pp. 353-355.

Wang, et al., "Learning Fine-grained Image Similarity with Deep Ranking", In Proceedings of the IEEE Conference on Computer Vision and Pattern Recognition, Jun. 23, 2014, pp. 1386-1393.

Wang, et al., "SuperGLUE: A Stickier Benchmark for General-Purpose Language Understanding System", In Proceedings 33rd Conference on Neural Information Processing Systems, Dec. 8, 2019, 30 Pages.

Wiegreffe, et al., "Attention is not not Explanation", In Proceedings of the Conference on Empirical Methods in Natural Language Processing and the 9th International Joint Conference on Natural Language Processing, Nov. 3, 2019, pp. 11-20.

Wolf, et al., "Transformers: State-of-the-Art Natural Language Processing", In Proceedings of the Conference on Empirical Methods in Natural Language Processing: System Demonstrations, Nov. 20, 2020, pp. 38-45.

Yang, et al., "XLNet: Generalized Autoregressive Pretraining for Language Understanding", In Proceedings of 33rd Conference on Neural Information Processing Systems, Dec. 8, 2019, 11 Pages.

Yi, et al., "Deep Metric Learning for Person Re-Identification", In Proceedings of 22nd International Conference on Pattern Recognition, Aug. 24, 2014, pp. 34-39.

Yosinski, et al., "Understanding Neural Networks Through Deep Visualization", In Repository of arXiv:1506.06579v1, Jun. 22, 2015, 12 Pages.

Yu, et al., "Visualizing and Comparing Convolutional Neural Networks", In Repository of arXiv:1412.6631v2, Dec. 26, 2014, 10 Pages.

Zeiler, et al., "Adaptive Deconvolutional Networks for Mid and High Level Feature Learning", In Proceedings of the International Conference on Computer Vision, Nov. 6, 2011, pp. 2018-2025.

* cited by examiner

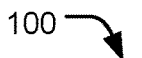
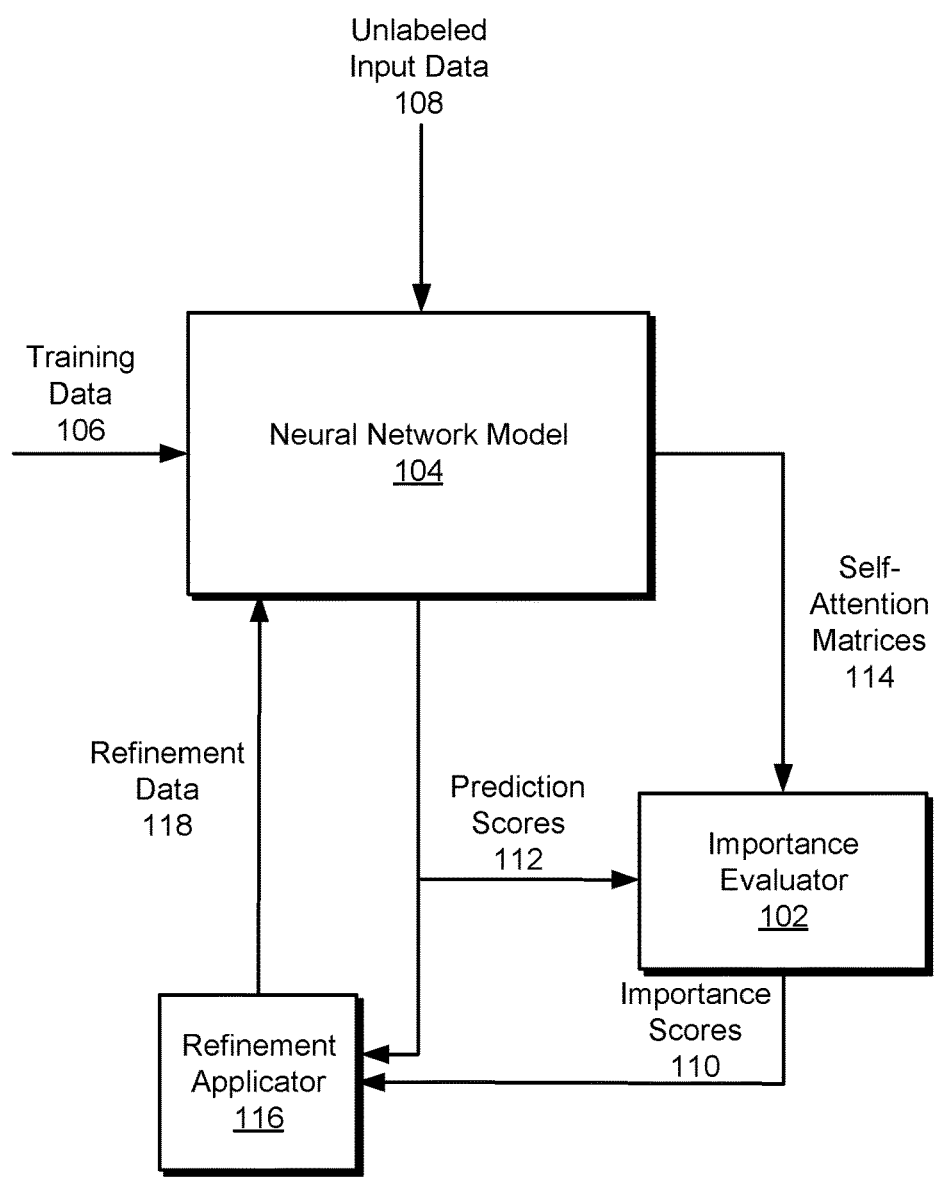
Unlabeled
Input Data
108
Training
Data
106
Neural Network Model
104
Self-
Attention
Matrices
114
Refinement
Data
118
Prediction
Scores
112
Importance
Evaluator
102
Importance
Scores
110
Refinement
Applicator
116
FIG. 1

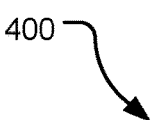

400

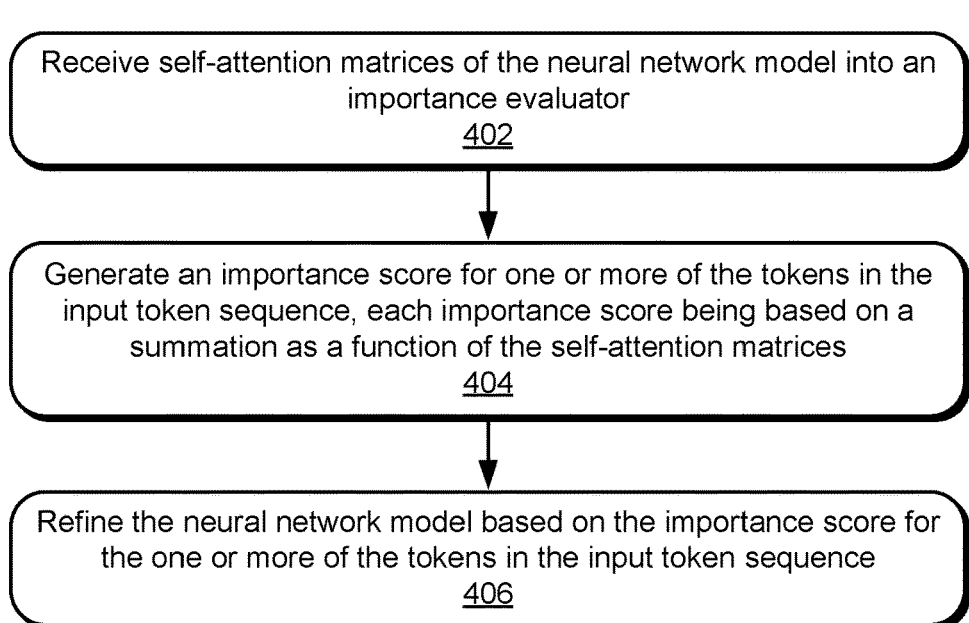

Receive self-attention matrices of the neural network model into an importance evaluator
402

Generate an importance score for one or more of the tokens in the input token sequence, each importance score being based on a summation as a function of the self-attention matrices
404

Refine the neural network model based on the importance score for the one or more of the tokens in the input token sequence
406

FIG. 4

DEEP SELF-ATTENTION MATRIX MODEL REFINEMENT

BACKGROUND

Deep contextualized language models can be applied to perform Natural Language Processing (NLP) tasks, such as question answering, co-reference resolution, and other NLP benchmarks. Such models provide an efficient framework for learning representations in a fully self-supervised manner from text corpora (e.g., by relying on co-occurrence statistics). Unlike traditional feature-based machine learning systems that assign and optimize weights for interpretable explicit features, a transformer-based architecture relies on a stack of multi-head self-attention layers composed of a large number (e.g., hundreds of millions) of parameters. Accordingly, this complexity makes it challenging to understand how individual elements of the input data (e.g., words, order, specific sequences, co-occurrence) impacted the results of the NLP tasks.

SUMMARY

The described technology provides a computing system and method for scoring the importance of a number of tokens in an input token sequence to one or more prediction scores computed by a neural network model on the input token sequence. The neural network model includes multiple encoding layers. Self-attention matrices of the neural network model are received into an importance evaluator. The self-attention matrices are generated by the neural network model while computing the one or more prediction scores based on the input token sequence. Each self-attention matrix corresponds to one of the multiple encoding layers. The importance evaluator generates an importance score for one or more of the tokens in the input token sequence. Each importance score is based on a summation as a function of the self-attention matrices, the summation being computed across the tokens in the input token sequence, across the self-attention matrices, and across the multiple encoding layers in the neural network model. Each importance score indicates an importance of a corresponding token in the input token sequence to the generation of the one or more prediction scores relative to other tokens in the input token sequence.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 1 illustrates an example machine learning system used in natural language processing (NLP) with an example importance evaluator providing importance scores for deep self-attention matrix model refinement.

FIG. 4 illustrates example operations providing importance scores for deep self-attention matrix model refinement relative to a neural network system.

DETAILED DESCRIPTIONS

Figure 2:
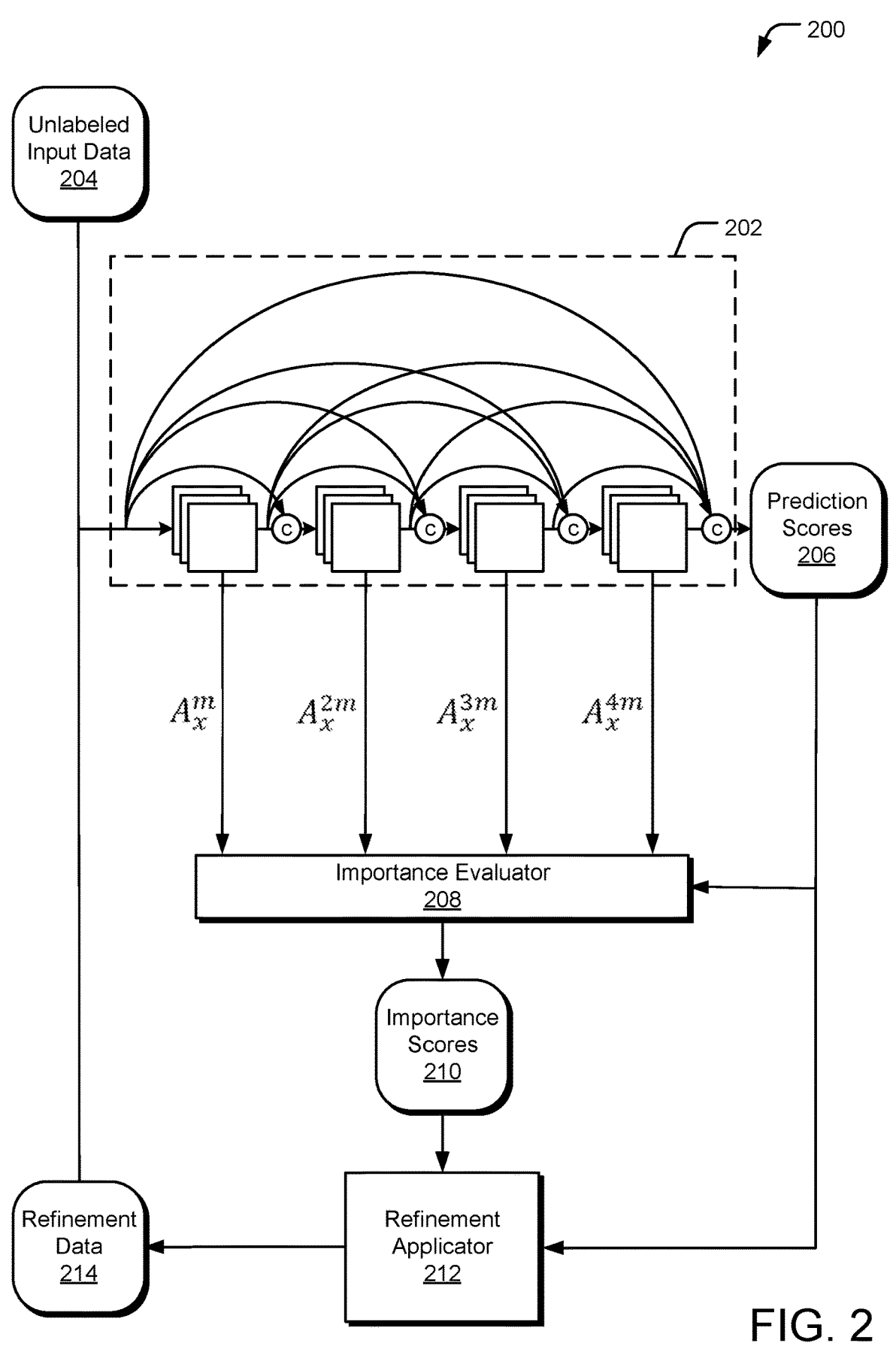
FIG. 2 illustrates an example machine learning system used with deep self-attention matrix model refinement.

At inference, transformer-based models compute pairwise interactions of a large number of resulting vector representations. In order to better understand how the model is working for a particular task, one can probe the model's performance through evaluation of lower-level components in the model. The described technology provides a sophisticated improvement over past model evaluation techniques with interpretation and model refinement methods that probe the attention matrices of a transformer-based model. In some implementations, the interpretation and refinement methods include consideration of gradients of the attention matrices to improve the accuracy of the model evaluation. Using the described technology, the improvements over previous approaches may include, without limitation:

- evaluating model performance during inference, rather than during training;
- analyzing self-attention units from multiple layers of the model;
- operating in a self-supervised manner;
- analyzing a finetuned transformer model without training an additional extractor network; and
- yielding faithful rationales of a model's performance independent of the NLP task performed.

By interpreting the model's performance during inference, a system can refine the model, such as by supplementing/refining training data supplied to the model. For example, if a model incorrectly predicts that the sentence "I'd like to say something positive about this movie, but nothing comes to mind" as a positive movie review, it is likely that the model was heavily influenced by the term "positive" when generating the incorrect prediction—e.g., the importance of the term can be ranked high by an importance evaluator. Accordingly, a refinement applicator can supply similar training data (e.g., training data that includes various uses of the term "positive") to reinforce the manner in which that term should be interpreted by the model.

FIG. 1 illustrates an example machine learning system 100 used in natural language processing (NLP) with an example importance evaluator 102 providing importance scores for deep self-attention matrix model refinement. In this NLP example, let $$\mathcal{T} = \{t_i\}_{i=1}^{N_T}$$

be a vocabulary of supported tokens. Let $\Omega$ be a set containing all sentences of length N that can be composed from $\mathcal{T}$ (shorter sentences are padded by a reserved token [PAD]), where each sentence starts and ends with the special tokens [CLS] (a sentence-level classification token, which is the first token of every input token sequence) and [SEP] (a separation token between sentences), respectively.

A neural network model 104 (e.g., a transformer-based neural network), such as a Bi-directional Encoder Representations from Transformers (BERT) model or other models based on self-attention (SA) units, is trained based on training data 106. It should be understood that, in some implementations, the training of the neural network model 104 may involve pre-training the neural network model 104 using one or more unsupervised tasks (e.g., a masked language model or MLM, a next sentence prediction or NSP) followed by fine tuning using labeled data for a specific downstream task (e.g., multiclass/binary classification, a regression task). In such as transformer, the number of classes/output dimension is represented by n, which changes with respect to the specific downstream task at hand.

After training (and/or independent of training) of the neural network model 104, unlabeled input data 108 (e.g., defined as x) is input to the neural network model 104 to perform a processing task, such as an NLP task of determining whether the text of a movie review (e.g., the unlabeled input data 108) provides a positive or negative review of the movie. In one or more implementations, the unlabeled input data 108 is received as a sequence (e.g., sentence) of N tokens $$x = (x_i)_{i=1}^N (x_i \in \mathcal{T}).$$

Given such input, the machine learning system 100 implements a parametric function s: $\Omega \rightarrow \mathbb{R}^n$ and outputs a n-dimensional vector of prediction score 112 over x, defined as $s_x := s(x)$. As the model processes each token (each position in the input token sequence), self-attention allows it to look at other positions in the input sequence for clues that can help lead to a better encoding for the current token. For example, when the model is processing one token sequence, self-attention allows the processing of each token in the sequence to look at other tokens to better understand which tokens contribute to the processing for the current token. More intuitively, "self-attention" references a characteristic that allows the token sequence processing to look through the token sequence's constituent tokens to determine how to represent each token.

The importance evaluator 102 receives the prediction scores 112 and self-attention matrices 114 from the neural network model 104 to generate importance scores 110, wherein each importance score $r_{x_i}$ indicates the importance of a token $x_i$ in the unlabeled input data 108 to the prediction scores 112 generated by the neural network model 104.

Given the model-specific importance scores 110 associated with each token in the unlabeled input data 108 and the resulting prediction scores 112), a refinement applicator 116 provides refinement data 118 to the neural network model 104 to improve its performance. In one example, an incorrect prediction can be flagged such that the refinement application 116 can supply new training data to the neural network model 104 to improve its performance. The new training data can be collected around the terms of greater importance identified by the importance evaluator 102 and the importance scores 110. In other implementations, changes in the design of the neural network model and/or pre-filtering of unlabeled input data, as suggested by the importance scores 110 for certain tokens, may be appropriate for improving the performance of the model.

FIG. 2 illustrates an example machine learning system 200 used with deep self-attention matrix model refinement. The machine learning system 200 includes a four-encoder-layer neural network model 202 as an example, although the number of encoder layers may vary. Furthermore, the first three encoder layers starting from the left are referred to as a "backbone network," and the right-most encoder layer is referred to as a "prediction head." Typically, the prediction head is devoted to a particular processing task (e.g., multiclass/binary classification, a regression task), and a given neural network model may include different heads for different tasks. In FIG. 2, it is assumed that the four-encoder-layer neural network model 202 has already been at least partially trained. Unlabeled input data 204 (e.g., one or more sentences with multiple tokens) is input to the four-encoder-layer neural network model 202 and propagates through the layers of the model.

The parametric function s is implemented as a cascade of L encoder layers (L=4 in FIG. 2). Given a sentence $x \in \Omega$, each token $x_i$ in the unlabeled input data 204 is mapped to a d-dimensional vector (embedding) to form a matrix $$U_x^0 \in \mathbb{R}^{d \times N}.$$

In practice, this embedding is a summation of the token, positional, and segment embeddings, although other embedding techniques may be employed. Then, $$U_x^0$$

is passed through a stack of L encoder layers. The l-th encoder layer ($1 \leq l \leq L$) receives the intermediate representations $$U_x^{l-1} \in \mathbb{R}^{d \times N}$$

(produced by the (l−1)-th layer), and outputs the new representations $$U_x^l.$$

Finally, $$u_{[CLS]}^L$$

(the first column in $$U_x^L,$$

which corresponds to the [CLS] token) is used as input to a subsequent fully connected layer that outputs $s_x$.

Each encoder layer employs M self-attention heads that are applied in parallel to $$U_x^{l-1},$$

producing M different attention matrices

5

$$A_x^{lm} = \text{softmax}\left(\frac{\left(W_q^{lm} U_x^{l-1}\right)^T W_k^{lm} U_x^{l-1}}{\sqrt{d_a}}\right),$$ (1)

where $$W_q^{lm}, W_k^{lm} \in \mathbb{R}^{d_a \times d},$$

are the query and key mappings, and $1 \leq m \leq M$. Each entry $$\left[A_x^{lm}\right]_{ij}$$

quantifies the amount of attention $x_i$ receives by $x_j$, according to the attention head m in the layer l. Then, the encoder output $$U_x^l$$

is obtained by a subsequent set of operations that involves the M attention matrices and value mappings. As a result, the four-encoder-layer neural network model 202 generates the prediction scores 206 ($s_x$).

A ground truth process is a term used in statistics and machine learning that means checking the results of machine learning for accuracy against the real world. The accuracy of the prediction scores 206 can depend on the performance of the four-encoder-layer neural network model 202, which can be limited at least by its design and/or training. Accordingly, the ground truth can be used to identify prediction errors in the output of the four-encoder-layer neural network model 202, but this process does not provide a robust understanding of why the errors were generated or how to improve the performance of the model.

Accordingly, the described technology explains the predictions made by the four-encoder-layer neural network model 202 using self-attention matrices $$A_x^{lm}$$

together (optionally, with their respective gradients) in order to produce a ranking over the tokens in x such that tokens that affect the model's prediction the most are ranked higher.

Given a sentence $x \in \Omega$ and a finetuned transformer-based model s, the prediction scores $s_x \in \mathbb{R}^n$ can be generated by the four-encoder-layer neural network model 202. The description of FIG. 2 focuses on classification tasks. Specifically, for binary classification, n=1, and we set $s_x$ as the logit score. However, for multiclass classification, n>1 (depending on the number of distinct classes), we focus on a specific entry in $s_x$ which is associated with the ground truth class to be explained. For the sake of brevity, from here onwards, $s_x$ represents the logit score in binary classification, or the logit score associated with the ground truth class $s_x$ (in the case of multiclass classification) and disambiguation should be clear from the context.

The importance of each token $x_i \in x$ with respect to s can be quantified by importance scores 210 evaluated using the described technology. In other words, tokens in x that contribute to s the most can be identified and indeed ranked, thereby explaining, at least in part, how the prediction was determined by the model. First, the unlabeled input data 204 (x) is propagated through the four-encoder-layer neural network model 202 to compute the prediction scores ($s_x$). Then, importance scores 210 (e.g., importance rankings) of the token $x_i$ with respect to the prediction score $s_x$ are computed by:

$$r_{x_i} = \frac{1}{LMN}\sum_{l=1}^{L}\sum_{m=1}^{M}\sum_{j=1}^{N}\left[H_x^{lm}\right]_{ij},$$ (1)

$$\text{with } H_x^{lm} = A_x^{lm} \circ \text{ReLU}\left(G_x^{lm}\right),$$ (3)

$$\text{where } G_x^{lm} := \frac{\partial s_x}{\partial A_x^{lm}}$$

are the element-wise gradients of $s_x$ with respect to the self-attention matrices $$A_x^{lm},$$

and $\circ$ stands for the Hadamard (or element-wise) product. The ReLU (Rectified Linear Unit) function is a non-linear activation function that is used in multi-layer neural networks or deep neural networks. The ReLU function can be represented as:

$$f(z) = \max(0, z)$$ (4)

where z=an input value. The term "rectifier," as used herein, refers to hardware and/or software that executes the ReLU function or a reLU-like function.

The self-attention matrices $$A_x^{lm}$$

are output by the various layers of the four-encoder-layer machine neural network 202 to the importance evaluator 208, which also receives the prediction scores 206 in some implementations. Eq. (1) scores the importance of each token $x_i \in x$ with respect to $s_x$, enabling ranking the tokens in x according to their importance. Higher values of $r_{x_i}$ indicate higher importance of $x_i$, hence a greater influence on the prediction score $s_x$. In practice, for $x_i \in \{[\text{CLS}], [\text{SEP}],[\text{PAD}]\}$, $r_{x_i}$ is set to $\infty$, as these tokens cannot provide for good explanations of the predictions scores.

A motivation behind Eqs. (2) and, (_b 3) is to identify tokens in x for which 1) high attention is received from other tokens in x (information from the attention activations), and 2) further increase in the amount of the received attention will increase $s_x$ the most (information from gradient of the attention activations). Eq. (3) ensures that these two conditions are met, since if $$\left[G_x^{lm}\right]_{ij} \leq 0, \text{ then } \left[H_x^{lm}\right]_{ij} = 0,$$

and if $$[A_x^{lm}]_{ij}$$

is small, then $$[H_x^{lm}]_{ij}$$

is close to zero (recall that $$[A_x^{lm}]_{ij} \geq 0,$$

as it is the result of softmax). Finally, Eq. (1) aggregates the overall contribution of the attention scores and the positive gradients from all SA heads across all encoder layers, with respect to $x_i \in x$.

Having computed the importance scores, the machine learning system 200 can input the importance scores 210 (along with their corresponding tokens) into a refinement applicator 212 to generate refinement data 214, which can be used to refine the four-encoder-layer neural network model 202. In one implementation, for example, the refinement data 214 may include supplemental training data that is focused on the higher ranking tokens, and on token sequences that include these same tokens, in the unlabeled input data 204. By training the four-encoder-layer neural network model 202 with training data that provides correct labeling based on these higher-ranking tokens, the model can improve its accuracy for future predictions. In another implementation, the refinement data 214 may provide insight into redesigning the four-encoder-layer neural network model 202, such as by adding or subtracting layers, incorporating different prediction heads for a given task, etc.

The ReLU function in Eq. (3) zeroes the negative gradients while preserving the values of $$H_x^{lm}$$

having positive gradients, which otherwise may be canceled out by a large accumulated negative value in the summation in Eq. (1). The activations in the i-th row within an attention matrix $$A_x^{lm}$$

quantify the importance of the token $x_i$ with respect to the other tokens in x. In addition, if $$[G_x^{lm}]_{ij} > 0,$$

then an increase in the activation $$[A_x^{lm}]_{ij}$$

should lead to an increase in the model's output score. Therefore, the importance of the token $x_i$ (according to the attention head m in the encoder layer l) is determined by the summation over the i-th row in $$H_x^{lm},$$

and the contribution to this sum come from elements for which both the activated self-attention matrix and its gradients are positive. Finally, the overall importance of $x_i$ is accumulated from the M self-attention heads in L layers according to Eq. (1).

In some transformer-based models, there are 144 self-attention matrices (M=12, L=12) that act as filters. However, in practice, only a few attention entries are substantially activated—a large number of activated self-attention matrices are close to zero and are also associated with negative gradients. The accumulated effect of this negative sum leads to a suppression (or even complete cancellation) of the small number of activated self-attention heads with positive gradients (which hold the actual information intended to be preserved). Hence, the negative gradients are zeroed (using ReLU). The application of the negative gradient trimming, prior to the summation, along with the complementary contribution from the activated self-attention matrices and their positive gradients, has been validated in an ablation study.

In other implementations, the gradients may be omitted, although the importance ranking may not be as robust as those computed using the gradients. In these implementations, the importance rankings may be given as:

$$r_{x_i} = \frac{1}{LMN} \Sigma_{l=1}^{L} \Sigma_{m=1}^{M} \Sigma_{j=1}^{N} [A_x^{lm}]_{ij}. \tag{5}$$

In these implementations, the prediction scores $s_x$ need not be input to the importance evaluator 208 because the implementations do not require computations of the gradients with respect to the prediction scores. Other implementations using various components based on the self-attention matrices may be employed. For example, implementations of the described technology may include without:

1. Att: Setting $$H_x^{lm} = A_x^{lm}$$

and using Eq. (1).

2. Att-Grad: Setting $$H_x^{lm} = G_x^{lm}$$

and using Eq. (1).

3. Att-Grad-R: Setting $$H_x^{lm} = ReLU(G_x^{lm})$$

and using Eq. (1).

4. Att×Att-Grad: Setting $$H_x^{lm} = A_x^{lm} \circ G_x^{lm}$$

and using Eq. (1).

5. Grad-SAM: Using Eqs. (1) and (3) as given above.

Figure 3:
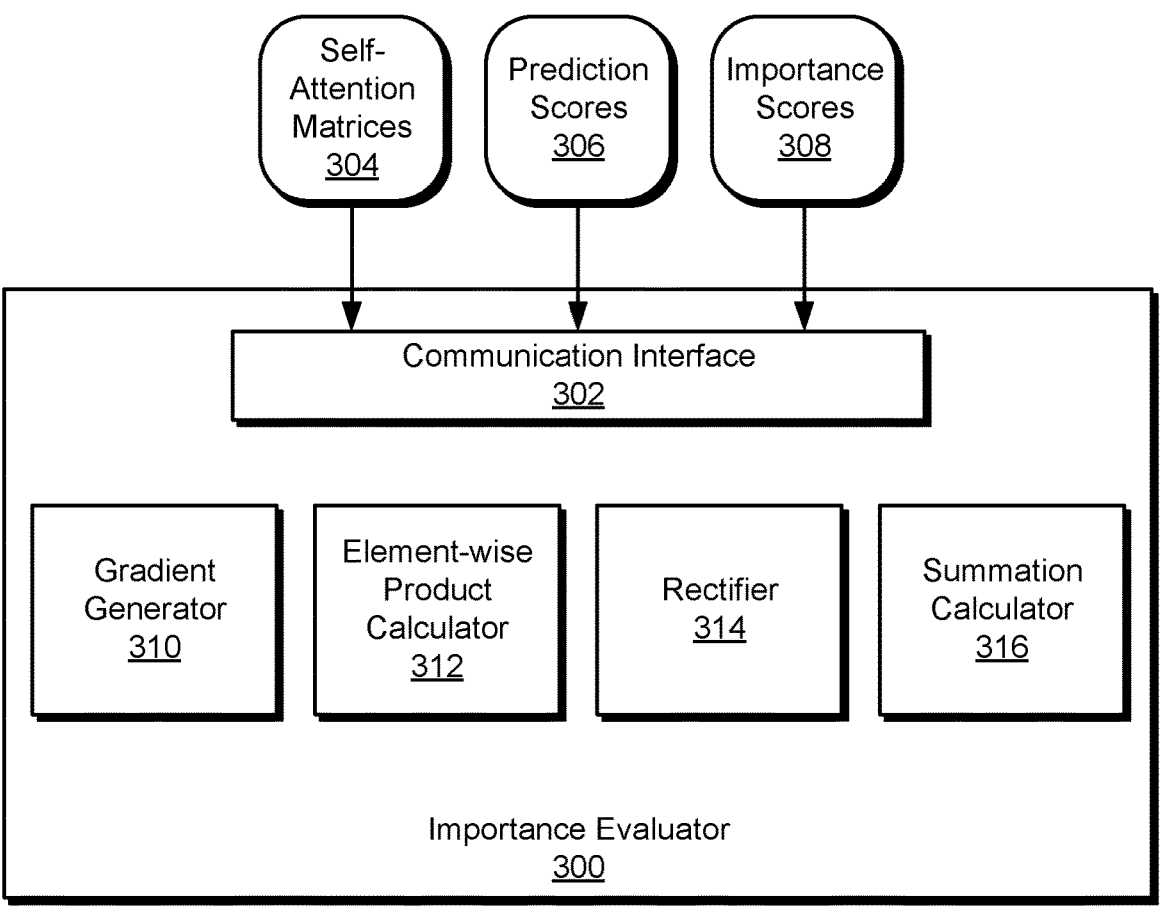
FIG. 3 illustrates an example importance evaluator providing importance scores for deep self-attention matrix model refinement relative to a neural network system.

FIG. 3 illustrates an example importance evaluator 300 providing importance scores for deep self-attention matrix model refinement relative to a neural network system. The importance evaluator 300 includes one or more communication interfaces (see a communication interface 302), which may be implemented in software and/or hardware and configured to receive self-attention matrices 304, such as from a neural network model, and corresponding prediction scores 306 and to output importance scores 308, such as to a refinement applicator.

Calculating elements of the important evaluator 300 may include without limitation a gradient generator 310, an element-wise product calculator 312, a rectifier 314, and a summation calculator 316. The gradient generator 310 is executable by one or more computing hardware processors to generate gradients of the prediction scores across the activated self-attention matrices. In one implementation, the gradients are calculated according to $$G_x^{lm} := \frac{\partial s_x}{\partial A_x^{lm}},$$

although other gradient calculations may be employed in other implementations.

In one implementation, the element-wise product calculator 312 computes the Hadamard (or element-wise) product of the self-attention matrices and the ReLU of the element-wise gradients, as shown in Eq. 3. Alternative implementations of the element-wise product calculator may be employed, such as computing $$H_x^{lm} = A_x^{lm} \circ G_x^{lm}$$

for use in Eq. (2).

In at least one implementation, the rectifier 314 computes the ReLU function on the gradients generated by the gradient generator 310. The summation calculator 316 computes the summations given in Eq. (3), and variations thereof, to yield the importance scores 308 (e.g., $r_{x_i}$).

FIG. 4 illustrates example operations 400 providing importance scores for deep self-attention matrix model refinement relative to a neural network system. The importance scores indicate the importance of a number of tokens in an input token sequence to one or more prediction scores computed by a neural network model on the input token sequence. The neural network model includes multiple encoding layers. A receiving operation 402 receives self-attention matrices of the neural network model into an importance evaluator. The self-attention matrices are generated by the neural network model while computing the one or more prediction scores based on the input token sequence and input to an importance evaluator. Each self-attention matrix corresponds to one of the multiple encoding layers. A generating operation 404 generates, in the importance evaluator, an importance score for one or more of the tokens in the input token sequence. Each importance score is based on a summation as a function of the self-attention matrices. The summation is computed across the tokens in the input token sequence, across the self-attention matrices, and across the multiple encoding layers in the neural network model. Accordingly, each importance score indicates an importance of a corresponding token in the input token sequence to the generation of the one or more prediction scores relative to other tokens in the input token sequence.

A refining operation 406 refines the neural network model based on the importance score for the one or more of the tokens in the input token sequence. In one implementation, the refining operation 406 may generate and/or input supplemental training data into the neural network model, wherein the supplemental training data is substantially focused on tokens that rank highly in the importance scores. Other refinements may include refinements to the design of the neural network model (e.g., adding/subtracting encoding layers).

Figure 5:
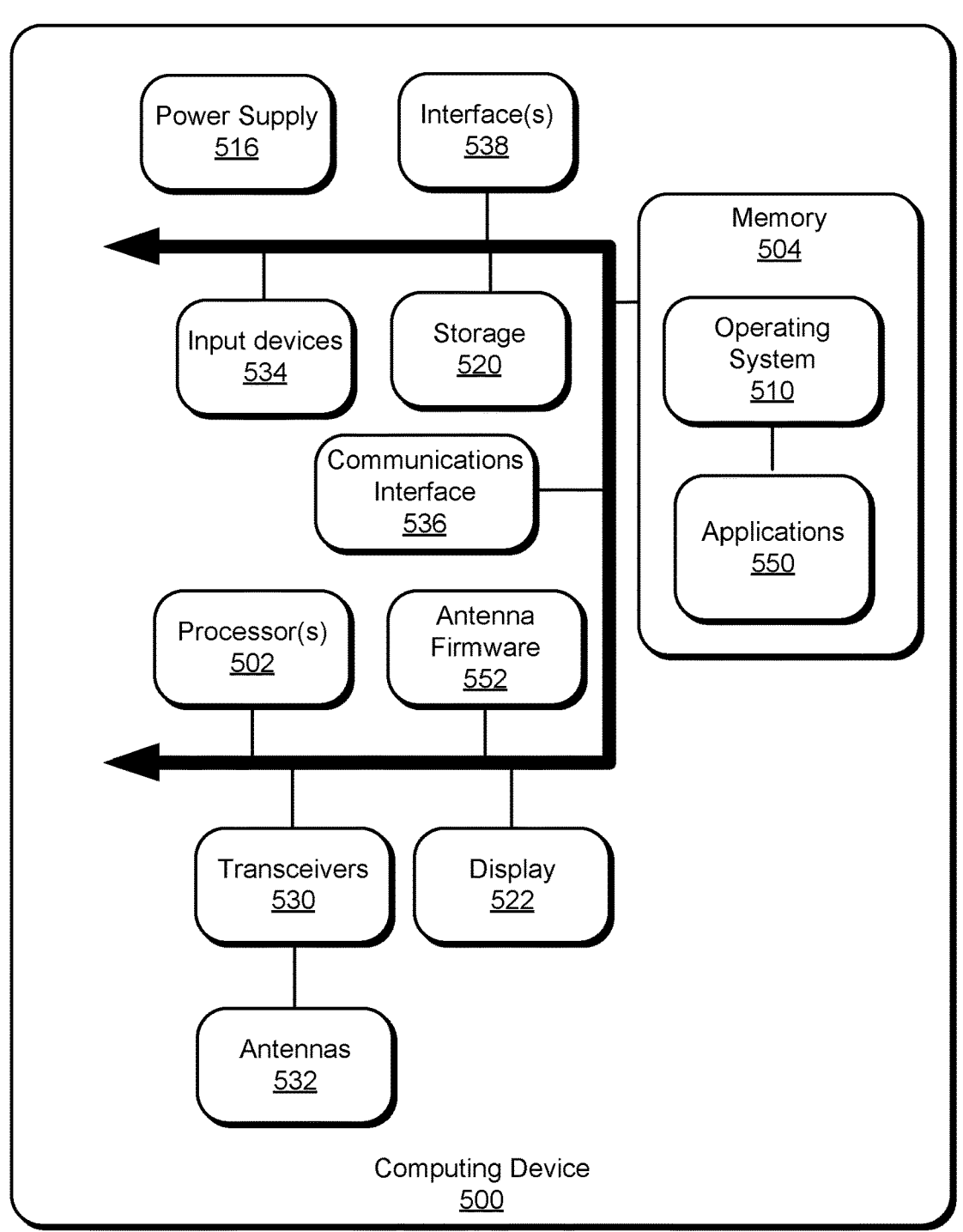
FIG. 5 illustrates an example computing device for use in refining a neural network system.

FIG. 5 illustrates an example computing device 500 in a computing system for use in refining a neural network system. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and non-volatile memory (e.g., flash memory). An operating system 510 resides in the memory 504 and is executed by the processor(s) 502.

In an example computing device 500, as shown in FIG. 5, one or more modules or segments, such as applications 550, a neural network model, an importance evaluator, a refinement applicator, all or part of a communication interface, a gradient generator, an element-wise product calculator, a rectifier, a summation calculator, and other modules, are loaded into the operating system 510 on the memory 504 and/or storage 520 and executed by processor(s) 502. The storage 520 may store prediction scores, unlabeled input data, training data, importance scores, self-attention matrices, and other data and be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a network adapter 536, which is a type of communication device. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example computing processor-based method of scoring importance of a number of tokens in an input token sequence to one or more prediction scores computed by a neural network model on the input token sequence is provided. The neural network model includes multiple encoding layers. Self-attention matrices of the neural network model are received into an importance evaluator. The self-attention matrices are generated by the neural network model while computing the one or more prediction scores based on the input token sequence. Each self-attention matrix corresponds to one of the multiple encoding layers. The importance evaluator generates an importance score for one or more of the tokens in the input token sequence. Each importance score is based on a summation as a function of the self-attention matrices, the summation being computed across the tokens in the input token sequence, across the self-attention matrices, and across the multiple encoding layers in the neural network model. Each importance score indicates an importance of a corresponding token in the input token sequence to the generation of the one or more prediction scores relative to other tokens in the input token sequence.

Another example computing processor-based method of any previous method is provided, wherein the summation as a function of the self-attention matrices includes a summation of the self-attention matrices.

Another example computing processor-based method of any previous method further includes receiving the one or more prediction scores, wherein the summation as a function of the self-attention matrices includes a summation of gradients of the prediction scores with respect to the self-attention matrices.

Another example computing processor-based method of any previous method further includes receiving the one or more prediction scores, wherein the summation as a function of the self-attention matrices includes a summation of positive gradients of the prediction scores with respect to the self-attention matrices, wherein any negative gradients of the prediction scores with respect to the self-attention matrices are zeroed.

Another example computing processor-based method of any previous method further includes receiving the one or more prediction scores, wherein the summation as a function of the self-attention matrices includes an element-wise product of the self-attention matrices and gradients of the prediction scores with respect to the self-attention matrices.

Another example computing processor-based method of any previous method further includes receiving the one or more prediction scores, wherein the summation as a function of the self-attention matrices includes an element-wise product of the self-attention matrices and positive gradients of the prediction scores with respect to the self-attention matrices, wherein any negative gradients of the prediction scores with respect to the self-attention matrices are zeroed.

Another example computing processor-based method of any previous method further includes refining the neural network model based on the importance score for the one or more of the tokens in the input token sequence.

An example computing system for scoring importance of a number of tokens in an input token sequence to one or more prediction scores computed by a neural network model on the input token sequence is provided, wherein the neural network model includes multiple encoding layers. The example computing system includes one or more hardware computing processors and a communication interface executable at least in part by the one or more hardware computing processors and configured to receive self-attention matrices of the neural network model. The self-attention matrices are generated by the neural network model while computing the one or more prediction scores based on the input token sequence. Each self-attention matrix corresponds to one of the multiple encoding layers. An importance evaluator is executable at least in part by the one or more hardware computing processors and configured to generate an importance score for one or more of the tokens in the input token sequence, each importance score being based on a summation as a function of the self-attention matrices. The summation is computed across the tokens in the input token sequence, across the self-attention matrices, and across the multiple encoding layers in the neural network model. Each importance score indicates an importance of a corresponding token in the input token sequence to the generation of the one or more prediction scores relative to other tokens in the input token sequence.

Another example computing system of any preceding system is provided, wherein the summation as a function of the self-attention matrices includes a summation of the self-attention matrices.

Another example computing system of any preceding system is provided, wherein the communication interface is further configured to receive the one or more prediction scores. The summation, as a function of the self-attention matrices, includes a summation of gradients of the prediction scores with respect to the self-attention matrices.

Another example computing system of any preceding system is provided, wherein the communication interface is further configured to receive the one or more prediction scores. The summation, as a function of the self-attention matrices, includes a summation of positive gradients of the prediction scores with respect to the self-attention matrices, wherein any negative gradients of the prediction scores with respect to the self-attention matrices are zeroed.

Another example computing system of any preceding system is provided, wherein the communication interface is further configured to receive the one or more prediction scores. The summation, as a function of the self-attention matrices, includes an element-wise product of the self-attention matrices and gradients of the prediction scores with respect to the self-attention matrices.

Another example computing system of any preceding system is provided, wherein the communication interface is further configured to receive the one or more prediction scores. The summation, as a function of the self-attention matrices, includes an element-wise product of the self-attention matrices and positive gradients of the prediction scores with respect to the self-attention matrices, wherein any negative gradients of the prediction scores with respect to the self-attention matrices are zeroed.

Another example computing system of any preceding system further includes a refinement applicator executable by the one or more computing hardware processors and configured to refine the neural network model based on the importance score for the one or more of the tokens in the input token sequence.

One or more example tangible processor-readable storage media is provided and embodied with instructions for executing on one or more processors and circuits of a computing device a process for scoring importance of a number of tokens in an input token sequence to one or more prediction scores computed by a neural network model on the input token sequence. The neural network model includes multiple encoding layers. The process includes receiving self-attention matrices of the neural network model into an importance evaluator, the self-attention matrices being generated by the neural network model while computing the one or more prediction scores based on the input token sequence, each self-attention matrix corresponding to one of the multiple encoding layers. The process also includes generating, in the importance evaluator, an importance score for one or more of the tokens in the input token sequence, each importance score being based on a summation as a function of the self-attention matrices, the summation being computed across the tokens in the input token sequence, across the self-attention matrices, and across the multiple encoding layers in the neural network model, wherein each importance score indicates an importance of a corresponding token in the input token sequence to the generation of the one or more prediction scores relative to other tokens in the input token sequence.

Other one or more example tangible processor-readable storage media of any preceding media are provided, wherein the summation as a function of the self-attention matrices includes a summation of the self-attention matrices.

Other one or more example tangible processor-readable storage media of any preceding media are provided, wherein the process further includes receiving the one or more prediction scores, wherein the summation as a function of the self-attention matrices includes a summation of gradients of the prediction scores with respect to the self-attention matrices.

Other one or more example tangible processor-readable storage media of any preceding media are provided, wherein the process further includes receiving the one or more prediction scores, wherein the summation as a function of the self-attention matrices includes a summation of positive gradients of the prediction scores with respect to the self-attention matrices, wherein any negative gradients of the prediction scores with respect to the self-attention matrices are zeroed.

Other one or more example tangible processor-readable storage media of any preceding media are provided, wherein the process further includes receiving the one or more prediction scores, wherein the summation as a function of the self-attention matrices includes an element-wise product of the self-attention matrices and gradients of the prediction scores with respect to the self-attention matrices.

Other one or more example tangible processor-readable storage media of any preceding media are provided, wherein the process further includes receiving the one or more prediction scores, wherein the summation as a function of the self-attention matrices includes an element-wise product of the self-attention matrices and positive gradients of the prediction scores with respect to the self-attention matrices, wherein any negative gradients of the prediction scores with respect to the self-attention matrices are zeroed.

An example system for scoring importance of a number of tokens in an input token sequence to one or more prediction scores computed by a neural network model on the input token sequence is provided. The neural network model includes multiple encoding layers. The system includes means for receiving self-attention matrices of the neural network model into an importance evaluator, the self-attention matrices being generated by the neural network model while computing the one or more prediction scores based on the input token sequence, each self-attention matrix corresponding to one of the multiple encoding layers. The system further includes means for generating, in the importance evaluator, an importance score for one or more of the tokens in the input token sequence, each importance score being based on a summation as a function of the self-attention matrices, the summation being computed across the tokens in the input token sequence, across the self-attention matrices, and across the multiple encoding layers in the neural network model, wherein each importance score indicates an importance of a corresponding token in the input token sequence to the generation of the one or more prediction scores relative to other tokens in the input token sequence.

Another example system of any previous system is provided, wherein the summation as a function of the self-attention matrices includes a summation of the self-attention matrices.

Another example system of any previous system is provided further includes means for receiving the one or more prediction scores, wherein the summation as a function of the self-attention matrices includes a summation of gradients of the prediction scores with respect to the self-attention matrices.

Another example system of any previous system is provided further includes means for receiving the one or more prediction scores, wherein the summation as a function of the self-attention matrices includes a summation of positive gradients of the prediction scores with respect to the self-attention matrices, wherein any negative gradients of the prediction scores with respect to the self-attention matrices are zeroed.

Another example system of any previous system is provided further includes means for receiving the one or more prediction scores, wherein the summation as a function of the self-attention matrices includes an element-wise product of the self-attention matrices and gradients of the prediction scores with respect to the self-attention matrices.

Another example system of any previous system is provided further includes means for receiving the one or more prediction scores, wherein the summation as a function of the self-attention matrices includes an element-wise product of the self-attention matrices and positive gradients of the prediction scores with respect to the self-attention matrices, wherein any negative gradients of the prediction scores with respect to the self-attention matrices are zeroed.

Another example system of any previous system is provided further includes means for refining the neural network model based on the importance score for the one or more of the tokens in the input token sequence.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing processor-based method of scoring importance of tokens in an input token sequence to one or more prediction scores computed by a neural network model on the input token sequence, wherein the neural network model includes multiple encoding layers, the computing processor-based method comprising:

receiving self-attention matrices of the neural network model into an importance evaluator, the self-attention matrices being generated by the neural network model while computing the one or more prediction scores based on the input token sequence, each self-attention matrix corresponding to one of the multiple encoding layers;

generating, in the importance evaluator, an importance score for one or more of the tokens in the input token sequence, each importance score being based on an aggregated summation as a function of the self-attention matrices, the aggregated summation being computed across the tokens in the input token sequence, across the self-attention matrices, and across the multiple encoding layers in the neural network model, each importance score indicating the importance of a corresponding token in the input token sequence to generation of the one or more prediction scores relative to other tokens in the input token sequence, wherein the aggregated summation is computed by performing a first summation of a set of filtered attention matrices of the self-attention matrices over a plurality of tokens in the input token sequence, performing a second summation of the first summation over a plurality of self-attention matrices generated by attention heads, and performing a third summation of the second summation over a plurality of encoding layers of the neural network model; and refining operation of the neural network model based on the importance scores for the tokens in the input token sequence by modifying the neural network model based on tokens in the input token sequence having higher importance scores than other tokens in the input token sequence.

2. The computing processor-based method of claim 1, wherein the aggregated summation as a function of the self-attention matrices includes a summation of filtered self-attention matrices of the self-attention matrices.

3. The computing processor-based method of claim 1, further comprising:

receiving the one or more prediction scores, wherein the aggregated summation as a function of the self-attention matrices includes a summation of gradients of the one or more prediction scores with respect to the self-attention matrices.

4. The computing processor-based method of claim 1, further comprising:

receiving the one or more prediction scores, wherein the aggregated summation as a function of the self-attention matrices includes a summation of positive gradients of the one or more prediction scores with respect to the self-attention matrices, wherein any negative gradients of the one or more prediction scores with respect to the self-attention matrices are zeroed.

5. The computing processor-based method of claim 1, further comprising:

receiving the one or more prediction scores, wherein the aggregated summation as a function of the self-attention matrices includes an element-wise product of the self-attention matrices and gradients of the one or more prediction scores with respect to the self-attention matrices.

6. The computing processor-based method of claim 1, further comprising:

receiving the one or more prediction scores, wherein the aggregated summation as a function of the self-attention matrices includes an element-wise product of the self-attention matrices and positive gradients of the one or more prediction scores with respect to the self-attention matrices, wherein any negative gradients of the one or more prediction scores with respect to the self-attention matrices are zeroed.

7. The computing processor-based method of claim 1, wherein modifying the neural network model comprises:

collecting supplemental training data corresponding to tokens in the input token sequence having higher importance scores than other tokens in the input token sequence; and training the neural network model using the supplemental training data.

8. The computing processor-based method of claim 1, wherein modifying the neural network model comprises:

redesigning the neural network model based relative importance scores of individual tokens in the input token sequence.

9. The computing processor-based method of claim 8, wherein modifying the neural network model comprises:

adding one or more encoding layers to the neural network model.

10. The computing processor-based method of claim 8, wherein modifying the neural network model comprises:

subtracting one or more encoding layers from the neural network model.

11. The computing processor-based method of claim 8, wherein modifying the neural network model comprises:

modifying prediction heads of the neural network model.

12. The computing processor-based method of claim 1, further comprising:

filtering the self-attention matrices using element-wise multiplication of each self-attention matrix and positive gradients of a prediction score of a corresponding self-attention matrix to generate the set of filtered attention matrices.

13. A computing system for scoring importance of tokens in an input token sequence to one or more prediction scores computed by a neural network model on the input token sequence, wherein the neural network model includes multiple encoding layers, the computing system comprising:

one or more hardware computing processors;

a communication interface executable at least in part by the one or more hardware computing processors and configured to receive self-attention matrices of the neural network model, the self-attention matrices being generated by the neural network model while computing the one or more prediction scores based on the input token sequence, each self-attention matrix corresponding to one of the multiple encoding layers;

an importance evaluator executable at least in part by the one or more hardware computing processors and configured to generate an importance score for one or more of the tokens in the input token sequence, each importance score being based on an aggregated summation as a function of the self-attention matrices, the aggregated summation being computed across the tokens in the input token sequence, across the self-attention matrices, and across the multiple encoding layers in the neural network model, each importance score indicating the importance of a corresponding token in the input token sequence to generation of the one or more prediction scores relative to other tokens in the input token sequence, wherein the aggregated summation is computed by performing a first summation of a set of filtered attention matrices of the self-attention matrices over a plurality of tokens in the input token sequence, performing a second summation of the first summation over a plurality of self-attention matrices generated by attention heads, and performing a third summation of the second summation over a plurality of encoding layers of the neural network model, and a refinement applicator executable at least in part by the one or more hardware computing processors and configured to refine operation of the neural network model based on the importance scores for the tokens in the input token sequence by modifying the neural network model based on tokens in the input token sequence having higher importance scores than other tokens in the input token sequence.

14. The computing system of claim 13, wherein the aggregated summation as a function of the self-attention matrices includes a summation of filtered self-attention matrices of the self-attention matrices.

15. The computing system of claim 13, wherein the communication interface is further configured to receive the one or more prediction scores, wherein the aggregated summation as a function of the self-attention matrices includes a summation of gradients of the one or more prediction scores with respect to the self-attention matrices.

16. The computing system of claim 13, wherein the communication interface is further configured to receive the one or more prediction scores, wherein the aggregated summation as a function of the self-attention matrices includes a summation of positive gradients of the one or more prediction scores with respect to the self-attention matrices, wherein any negative gradients of the one or more prediction scores with respect to the self-attention matrices are zeroed.

17. The computing system of claim 13, wherein the communication interface is further configured to receive the one or more prediction scores, wherein the aggregated summation as a function of the self-attention matrices includes an element-wise product of the self-attention matrices and gradients of the one or more prediction scores with respect to the self-attention matrices.

18. The computing system of claim 13, wherein the communication interface is further configured to receive the one or more prediction scores, wherein the aggregated summation as a function of the self-attention matrices includes an element-wise product of the self-attention matrices and positive gradients of the one or more prediction scores with respect to the self-attention matrices, wherein any negative gradients of the one or more prediction scores with respect to the self-attention matrices are zeroed.

19. One or more tangible processor-readable storage media embodied with instructions for executing on one or more processors and circuits of a computing device a process for scoring importance of tokens in an input token sequence to one or more prediction scores computed by a neural network model on the input token sequence, wherein the neural network model includes multiple encoding layers, the process comprising:

receiving self-attention matrices of the neural network model into an importance evaluator, the self-attention matrices being generated by the neural network model while computing the one or more prediction scores based on the input token sequence, each self-attention matrix corresponding to one of the multiple encoding layers;

generating, in the importance evaluator, an importance score for one or more of the tokens in the input token sequence, each importance score being based on an aggregated summation as a function of the self-attention matrices, the aggregated summation being computed across the tokens in the input token sequence, across the self-attention matrices, and across the multiple encoding layers in the neural network model, each importance score indicating the importance of a corresponding token in the input token sequence to generation of the one or more prediction scores relative to other tokens in the input token sequence, wherein the aggregated summation is computed by performing a first summation of a set of filtered attention matrices of the self-attention matrices over a plurality of tokens in the input token sequence, performing a second summation of the first summation over a plurality of self-attention matrices generated by attention heads, and performing a third summation of the second summation over a plurality of encoding layers of the neural network model; and refining operation of the neural network model based on the importance scores for the tokens in the input token sequence by modifying the neural network model based on tokens in the input token sequence having higher importance scores than other tokens in the input token sequence.

20. The one or more tangible processor-readable storage media of claim 19, wherein the aggregated summation as a function of filtered self-attention matrices of the self-attention matrices includes a summation of the self-attention matrices.

21. The one or more tangible processor-readable storage media of claim 19, wherein the process further comprises:

receiving the one or more prediction scores, wherein the aggregated summation as a function of the self-attention matrices includes a summation of gradients of the one or more prediction scores with respect to the self-attention matrices.

22. The one or more tangible processor-readable storage media of claim 19, wherein the process further comprises:

receiving the one or more prediction scores, wherein the aggregated summation as a function of the self-attention matrices includes a summation of positive gradients of the one or more prediction scores with respect to the self-attention matrices, wherein any negative gradients of the one or more prediction scores with respect to the self-attention matrices are zeroed.

23. The one or more tangible processor-readable storage media of claim 19, wherein the process further comprises:

receiving the one or more prediction scores, wherein the aggregated summation as a function of the self-attention matrices includes an element-wise product of the self-attention matrices and gradients of the one or more prediction scores with respect to the self-attention matrices.

24. The one or more tangible processor-readable storage media of claim 19, wherein the process further comprises:

receiving the one or more prediction scores, wherein the aggregated summation as a function of the self-attention matrices includes an element-wise product of the self-attention matrices and positive gradients of the one or more prediction scores with respect to the self-attention matrices, wherein any negative gradients of the one or more prediction scores with respect to the self-attention matrices are zeroed.

* * * * *